Patented Mar. 28, 1939

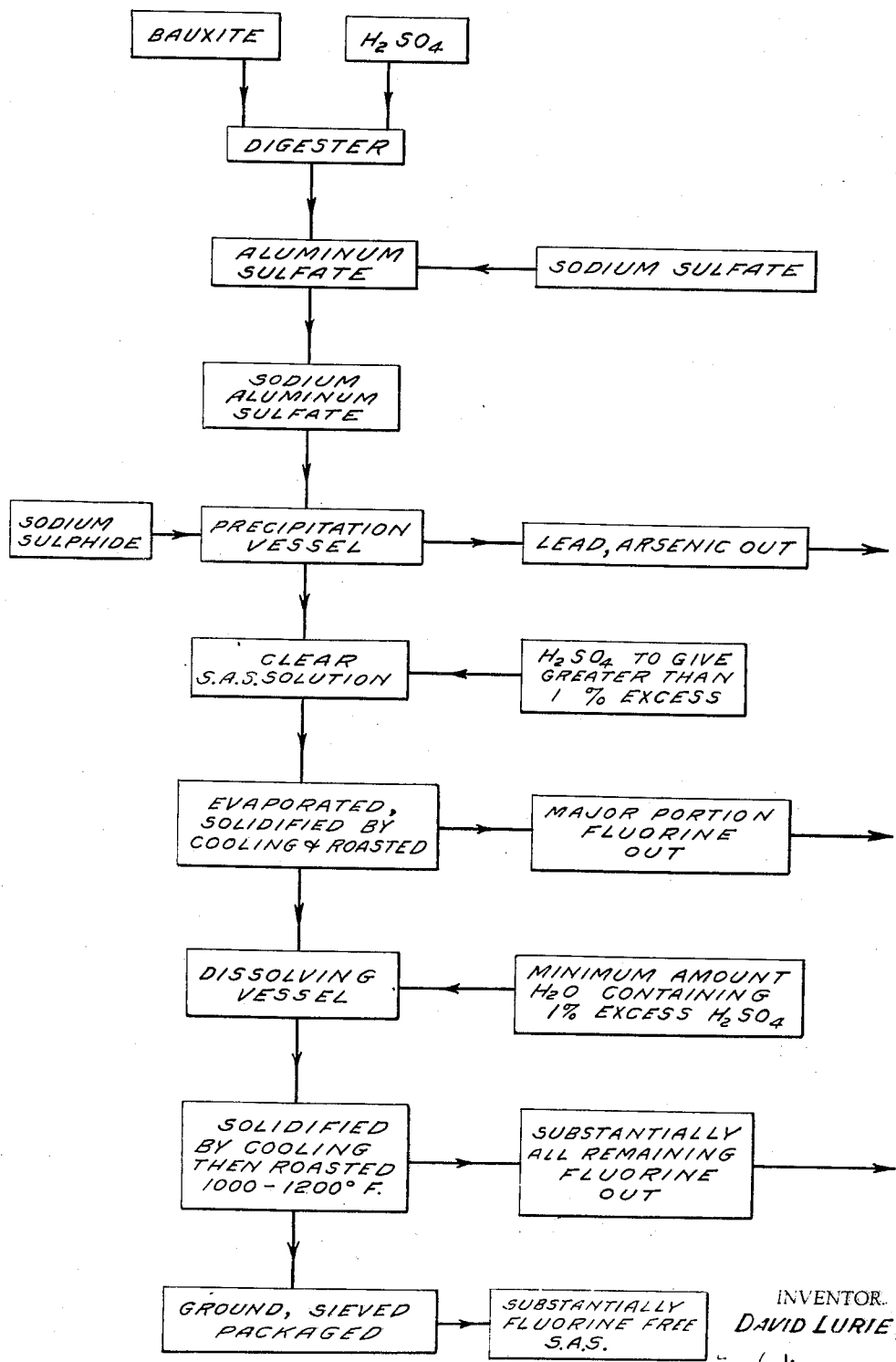

2,152,597

UNITED STATES PATENT OFFICE 2,152,597

METHOD OF PREPARING SODIUM ALUMINUM SULPHATE SUBSTANTIALLY FLUORINE FREE

David Lurie, Joliet, Ill., assignor to American Cyanamid & Chemical Corporation, New York, N. Y., a corporation of Delaware Application March 19, 1937, Serial No. 131,795

5 Claims. (Cl. 23—118)

The present invention relates to methods of producing sodium aluminum sulphate substantially free from fluorine, that is, with a fluorine content low enough so that the product is suitable for use as a food, of which making powder is an example.

In the production of sodium aluminum sulphate, aluminum bearing earths, such as bauxite, are used as a starting point. These substances are usually high in fluorine, that is, they may contain as high as 5000 parts per million. The normal process of producing sodium aluminum sulphate is to digest bauxite or other similar earths with sulphuric acid, add the requisite quantity of sodium sulphate to form the double sulphate followed by evaporation and roasting. It has been found, however, that this method does not have the effect of reducing the fluorine content of the final product to a point where it may be used as a food ingredient, although it may be useful in other situations where its fluorine content is of no moment. As a matter of fact, in the ordinary process, it is difficult if not impossible to reduce the fluorine content of the final product to much below 200 parts per million.

It has been proposed to reduce the fluorine content of the final product by utilizing a higher roasting temperature, the attempt being to remove the fluorine during this step of the process. While some measure of success has been had along this line, yet as a result of the higher temperature, the product assumes undesirable physical characteristics such as high density and decreased solubility. Inasmuch as the rate at which sodium aluminum sulphate hydrates and reacts in the dough mixture has a great influence on its baking characteristics when used as a baking powder ingredient, it is important that the process not result in imparting characteristics to the product which would decrease its hydration rate. A product having high density and decreased solubility is objectionable from the standpoint in that its rate of solubility is materially decreased.

The principal object of the invention, therefore, is to produce a sodium aluminum sulphate having a low fluorine content such that it will be suitable as a baking powder or other food ingredient, with desirable solubility and without those characteristics which are the function of high roasting temperatures.

It has been discovered that the above may be satisfactorily accomplished even using an aluminum bearing earth high in fluorine by digesting the same with sulphuric acid, converting the resulting aluminum sulphate into the double sulphate of aluminum and sodium by adding thereto requisite quantities of sodium sulphate. This product has been found to contain impurities such as lead and/or arsenic, which, however, may be suitably removed by precipitation with sodium sulphide, for instance. This precipitated material may then be removed, leaving the sodium aluminum sulphate as a clear solution. If sulphuric acid is now added to this solution in excess of that required to combine with any aluminum and sodium present, uncombined as sodium aluminum sulphate, and preferably greater than 1% excess thereover, upon evaporation, solidification by cooling and roasting, the major portion of the fluorine will be removed, even though roasting temperatures not in excess of 1200° F. are used. It has been further discovered that if the calcine from the roasting operation is then added, preferably hot, to a minimum quantity of water to dissolve the same and an excess of sulphuric acid over that necessary to combine with any aluminum and sodium present uncombined as sodium aluminum sulphate, and preferably in excess of 1% thereover, is added to the solution followed by evaporation, solidification by cooling and roasting, substantially all of the remaining fluorine passes out with the roaster gases. Starting with a bauxite material containing 5000 parts per million, it has been possible by this process to produce sodium aluminum sulphate with a fluorine content of less than 10 parts per million.

The flow sheet illustrates diagrammatically the method of this invention, to which the following reference is made.

Bauxite is, perhaps, the cheapest type of aluminum bearing earths available, although heretofore it has been objectionable in that the cheaper varieties thereof are exceptionally high in fluorine and for this reason, have been unsatisfactory in producing a low fluorine content sodium aluminum sulphate useful as a food ingredient. However, with the present method, this difficulty is avoided.

Starting with bauxite, it is digested with a fairly high concentration of sulphuric acid to produce aluminum sulphate. To this reaction product, requisite quantities of sodium sulphate may now be added either in the form of a solution or as a solid salt to form a double sodium aluminum sulphate in solution. Inasmuch as this product contains a certain amount of lead and arsenic impurities carried therein from the impure starting materials, these must be removed if the final product is to be of good quality and is to be used as a food ingredient. The addition of sodium sulphide at this point precipitates these impurities which then may be removed as by filtering, leaving a clear sodium aluminum sulphate solution.

To this solution is added sulphuric acid in excess of that required to combine with any aluminum and sodium present uncombined as sodium aluminum sulphate. This excess may be as high as 8% but to secure best results, should be at least a 1% excess. Of course, the clear sodium aluminum sulphate solution does contain some free sulphuric acid so that the acid content thereof should be adjusted to give the desired excess. The solution should then be evaporated to approximately 50% solids so that upon cooling, the concentrate solidifies. The solid product may then be transferred to a roasting furnace of any desired type and subjected to a roasting temperature of between 1000 and 1200° F. Under these conditions, not only is the water and excess acid removed but the major portion of the fluorine passes off with the roaster gases.

The calcine from this operation, preferably hot, is then dissolved in a minimum quantity of water containing sulphuric acid in excess of that required to combine with any aluminum and sodium present, uncombined as sodium aluminum sulphate. As in the first acid adjustment, this excess may be as high as 8% and should not, to produce the best results, drop below a 1% excess.

By using a minimum quantity of water at this stage, extraneous heat for evaporation is unnecessary inasmuch as the sensible heat of the product as well as its heat of hydration will cause the solution to boil vigorously. Upon cooling, the product solidifies and then may be passed to a roasting furnace. In this apparatus, a temperature of from 1000 to 1200° F. is maintained, which has the effect of removing water, excess acid and substantially all of the remaining fluorine. The product may then be cooled, ground, sieved and packaged.

With the process as above outlined, sodium aluminum sulphate has been produced containing as low as 10 parts per million of fluorine.

The following is given as a specific example:

1000 lbs. of 100% sulphuric acid are diluted to about 40° Bé. and heated to a temperature of about 270° F. To this hot acid sufficient bauxite is added (approximately 700 lbs.) to effect a complete reaction between the bauxite and the sulphuric acid and a resultant formation of aluminum sulphate. The charge is diluted to about 32° Bé. To this impure solution of aluminum sulphate a saturated solution of about 400 lbs. of salt cake, or its equivalent in any other compound containing sodium sulphate, is added in order to form the double salt sodium aluminum sulphate, $Na_2Al_2(SO_4)_4$.

The resultant sodium aluminum sulphate liquor is treated with approximately 25 pounds of sodium sulphide in order to effect the precipitation of such impurities as lead and arsenic. The solution is then allowed to settle and the resultant clear liquor is drawn off.

To the clear solution about 150 pounds of 100% sulphuric acid are added and the resultant liquor containing at this stage about 8% excess of acid is evaporated, discharged on pans, and the cake resulting upon cooling is roasted at a temperature of 1000° F.–1200° F. for a period of four to five hours.

By roasting the material in this manner, considerable fluorine will be removed during the roasting, and the fluorine content of the roasted material at this stage will be about 60 to 80 parts per million.

The hot roasted material is then charged into an evaporator containing about 1500 lbs. of water and about 50 pounds of 100% sulphuric acid. The sensible heat of the roasted material as well as the heat of hydration will cause prompt solution of the material and evaporation to a point where upon discharge on pans, the material will solidify upon cooling. The resultant cake is then charged into roasters and roasted at a temperature of 1000° to 1200° F. for a period of four to five hours. Substantially all the remaining fluorine will be removed during this roasting, and the finished product will have a fluorine content not to exceed 10 parts per million.

While the invention has been shown and described with particular reference to specific embodiments, yet it is to be understood that it is not to be limited thereto, but is to be construed broadly and restricted only by the scope of the claims.

I claim:

1. A method of preparing sodium aluminum sulphate with a low fluorine content suitable for use as a baking powder ingredient, which includes the following steps, treating sodium aluminum sulphate high in fluorine with from 1 to 8% of sulphuric acid in excess of that required to combine with any aluminum and sodium present, uncombined as sodium aluminum sulphate, evaporating the resulting solution and roasting the product at a fluorine removing temperature under 1200° F., dissolving the calcined material in water containing 1 to 8% of sulphuric acid in excess of that required to combine with the aluminum and sodium present and evaporating the solution and roasting the resulting product at a fluorine removing temperature under 1200° F. whereby the major portion of the fluorine remaining after the first roasting treatment is removed.

2. The method of claim 1 in which the roasting temperature is from 1000 to 1200° F.

3. A method of preparing sodium aluminum sulphate with a low fluorine content suitable for use as a baking powder ingredient which includes the following steps, digesting bauxite and sulphuric acid to form a solution of aluminum sulphate, adding sufficient quantity of sodium sulphate thereto to form a solution of sodium aluminum sulphate, precipitating therefrom lead and arsenic impurities by adding thereto sodium sulphide and separating the insoluble from the sodium aluminum sulphate solution, treating the solution with 1 to 8% of sulphuric acid in excess of that required to combine with any aluminum and sodium present, uncombined as sodium aluminum sulphate, evaporating the resulting solution and roasting the product to remove the major portion of its contained fluorine, dissolving the calcined material in water containing 1 to 8% of sulphuric acid in excess of that required to combine with any aluminum and sodium present, uncombined as sodium aluminum sulphate, evaporating the solution and roasting the resulting product to remove water and excess acid and the major portion of the remaining fluorine.

4. A method of preparing sodium aluminum sulphate with a low fluorine content suitable for use as a baking powder ingredient, which includes the following steps: digesting bauxite and sulphuric acid to form a solution of aluminum sulphate, adding sufficient quantity of sodium sulphate thereto to form a solution of sodium aluminum sulphate, adding to the solution sodium sulphide, separating the insolubles from the sodium aluminum sulphate solution, treating the solution with 1 to 8% of sulphuric acid in excess of that required to combine with any aluminum and sodium present, uncombined as sodium aluminum sulphate, evaporating the resulting solution and roasting the product at a temperature of from 1000 to 1200° F. for from four to five hours.

5. A method of preparing sodium aluminum sulphate with a low fluorine content and lacking those undesirable physical properties such as high density and decreased solubility which are characteristics of high roasting temperatures, suitable for use as a baking powder ingredient, which includes the following steps: treating sodium aluminum sulphate solution with sodium sulphide, separating the insolubles from the sodium aluminum sulphate solution, adding thereto from 1 to 8% of sulphuric acid in excess of that required to combine with any aluminum and sodium present, uncombined as sodium aluminum sulphate, evaporating the resulting solution, roasting the product at from 1000 to 1200° F., dissolving the calcined material in water containing from 1 to 8% of sulphuric acid in excess of that required to combine with any aluminum and sodium present, uncombined as sodium aluminum sulphate, evaporating the solution and roasting the resulting product at from 1000° to 1200° F.

DAVID LURIE.